United States Patent
Slightam et al.

(10) Patent No.: US 7,679,763 B2
(45) Date of Patent: Mar. 16, 2010

(54) SYSTEM AND METHOD FOR MANAGING CAPABILITIES IN A NETWORK

(75) Inventors: Daniel Slightam, Vancouver, WA (US); Bob Taylor, Washougal, WA (US); Kevin Cole, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1507 days.

(21) Appl. No.: 10/998,405

(22) Filed: Nov. 29, 2004

(65) Prior Publication Data

US 2006/0114493 A1 Jun. 1, 2006

(51) Int. Cl.
G06F 3/12 (2006.01)
G06F 17/00 (2006.01)

(52) U.S. Cl. .............. 358/1.15; 358/442; 358/1.12; 358/468; 358/1.16; 709/201; 707/101

(58) Field of Classification Search ............ 358/1.15, 358/442, 1.12, 468, 1.16
See application file for complete search history.

(56) References Cited

U.S. PATENT DOCUMENTS

| | | |
|---|---|---|
| 5,450,571 A | 9/1995 | Rosekrans et al. |
| 6,173,295 B1 | 1/2001 | Goertz et al. |
| 6,335,795 B1 * | 1/2002 | Neuhard et al. ............ 358/1.15 |
| 6,476,295 B2 | 11/2002 | Barry et al. |
| 6,498,656 B1 | 12/2002 | Mastie et al. |
| 6,762,852 B1 * | 7/2004 | Fischer ..................... 358/1.15 |
| 7,136,941 B2 * | 11/2006 | Nguyen et al. ............... 710/15 |
| 2005/0210227 A1 * | 9/2005 | Emerson et al. ............... 713/1 |

FOREIGN PATENT DOCUMENTS

JP 2002171383 A * 6/2002

* cited by examiner

*Primary Examiner*—Benny Q Tieu
*Assistant Examiner*—Huo Long Chen

(57) ABSTRACT

Systems and methods for managing capabilities in a network are described. The method describes receiving a first capabilities data structure having a first dataset from a primary service, and then receiving a second capabilities data structure having a second dataset from one or more secondary services. The method next describes combining at least the first dataset and the second dataset into a combined capabilities data structure and providing services within the network based on the combined capabilities data structure. Another method describes requesting first and second job tickets from first and second services, where the tickets include first and second nodes respectively. The method next describes identifying the first and second job ticket nodes, and determining whether the nodes are capable of being aggregated. Finally, the method describes aggregating the nodes that are capable of being aggregated, and producing a consumable result job ticket that includes the aggregated nodes.

20 Claims, 4 Drawing Sheets

SYSTEM AND METHOD FOR MANAGING CAPABILITIES IN A NETWORK

BACKGROUND

A computer network connects multiple processor-controlled devices. A network allows the connected devices to provide various functions and services. In modern service-based systems, there are frequently many (often thousands) of destinations that may implement a given task. However, each destination may have different capabilities and constraints or limitations with respect to the task. If a client is familiar with a destination, the client can use this information to guide the configuration and invocation of the task. If, though, the client has not chosen the destination at the time of a job invocation (e.g. likely the case if a service is intermediating between the client and the destination), the client does not have a way to understand how to configure the task. Typically, it is not reasonable for the client to know the capabilities of each potential individual destination, as there could possibly be thousands of potential destinations.

Each time the end user or end user application performs a task, the goal is to accurately present all the devices, services features and options that are available on the network. Enterprise distributed network environments are particularly dynamic, and services available to an end user may come on and offline. Software updates can change the feature sets that are available in client software such as drivers. Network managers may need to enforce a policy on services deployed in the network and track usage of the deployed services. Present network systems require prior knowledge by a client service of the other services distributed across the enterprise, which then must tailor their behavior and feature sets accordingly. Such a pre-knowledge requirement for services requires tight coupling of components and services, special tool sets and human administration. It would be desirable therefore, to provide advancements to the art that overcome these and other disadvantages.

SUMMARY

According to an embodiment of the present invention, a method is directed to capabilities management in a processor-controlled network. The method describes receiving a first capabilities data structure having at least a first dataset from a primary service and receiving at least a second capabilities data structure having at least a second dataset from one or more secondary services. The method next describes combining at least the first dataset of the first data structure and at least the second dataset of the at least second data structure into a combined capabilities data structure and providing services within the network based on the combined capabilities data structure.

According to another embodiment, a method is directed to managing capabilities distributed in a network. The method describes requesting a first job ticket from a first service, the first job ticket including at least a first job ticket node, and requesting at least a second job ticket from at least a second service, the second job ticket including at least one second job ticket node. The method next describes identifying at least a first job ticket node from the requested first job ticket and at least a second job ticket node from the second job ticket, and determining whether the identified first and second job ticket nodes are capable of being aggregated. Finally, the method describes aggregating the identified first and second job ticket nodes that are capable of being aggregated, and producing a consumable result job ticket that includes the aggregated first and second job ticket nodes.

According to still another embodiment, a system to provide capabilities management in a processor-controlled network is described. The system provides a network including a plurality of service devices coupled to the network and providing services. The devices of the system include services means, communication interface means, and processing means. The system further describes computer readable memory means which is readable by the processing means. The computer readable memory means contains a series of computer executable steps configured to cause the processing means to request a first job ticket from a first service, the first job ticket including at least a first job ticket node. The memory means further includes a series of computer executable steps configured to cause the processing means to request at least a second job ticket from at least a second service, the second job ticket including at least one second job ticket node. The memory means also includes a series of computer executable steps configured to cause the processing means to identify at least a first job ticket node from the requested first job ticket, and at least a second job ticket node from the second job ticket, and determine whether the identified first and second job ticket nodes are capable of being aggregated. Finally, the memory means includes a series of computer executable steps configured to cause the processing means to aggregate the identified first and second job ticket nodes that are capable of being aggregated, and to produce a consumable result job ticket that includes the aggregated first and second job ticket nodes.

The foregoing, and other features and advantages of the invention, will become further apparent from the following detailed description of the presently preferred embodiments read in conjunction with the accompanying drawings.

DETAILED DESCRIPTION

Non-limiting embodiments of the present invention provide for methods and systems for improved capabilities management in a network. According to an embodiment of the present invention, a system provides capabilities management in a processor-controlled network.

Figure 1:
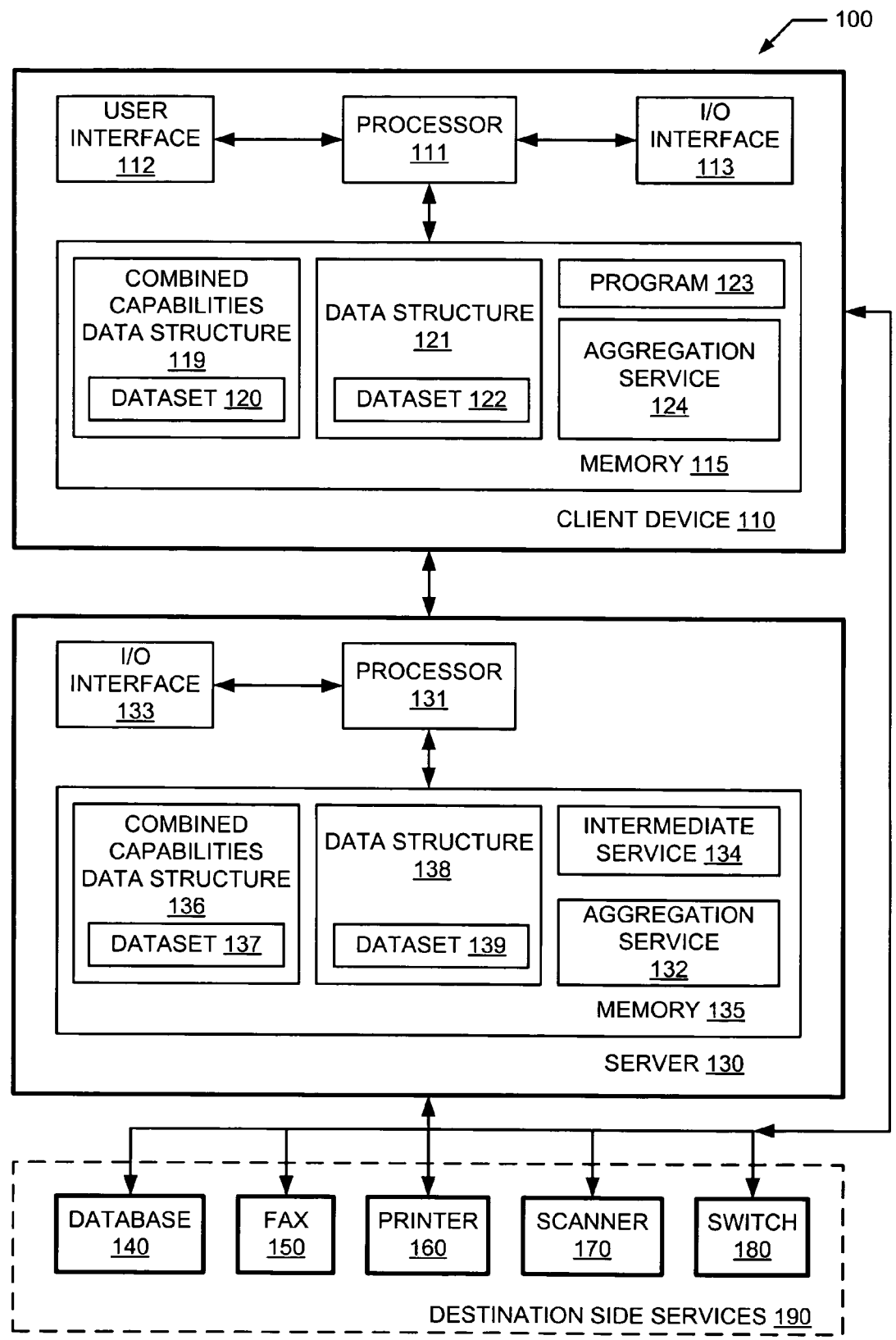
FIG. 1 is a block diagram of a distributed enterprise system, illustrating an exemplary operating environment for an embodiment of the present invention.

FIG. 1 is a block diagram of a distributed enterprise system, illustrating an exemplary operating environment for an embodiment of the present invention. FIG. 1 illustrates a network 100 configured for implementing a capabilities management system. Exemplary devices of network 100, as shown in FIG. 1, include client device 110, server 130, database 140, facsimile machine 150, printer 160, scanner 170, and switch 180. Connections depicted between client device 110, server 130, and other devices illustrate a distributed enterprise system. Each device of network 100 has a unique device identification and network address, such that devices are enabled to communicate with one another and provide client side, destination side and distributed services.

FIG. 1 shows client device 110 further comprising a processor 111, a user interface 112, an input/output interface 113, and a memory device 115. The memory device 115 is shown including a program 123, a data structure 121 having a dataset 122, a combined capabilities data structure 119 having a dataset 120, and aggregation service 124. Processor 111 is further shown enabled for bidirectional communication with user interface 112, input/output interface 113, and memory device 115. In FIG. 1, client device 110 is shown enabled for bidirectional communication with various devices of network 100 though a communication interface, such as input/output interface 113. Client device 110 is any device configurable for providing an interface to various functions and services of network 100. In an embodiment, client device 110 is a device such as a personal computer (PC) that includes various capabilities provided by one or more programs 123. The skilled practitioner will recognize that in some implementations client device 110 includes other components not relevant to the present discussion and therefore do not require elaboration.

Processor 111 of client device 110 is any microprocessor, microcontroller, application-specific integrated circuit (ASIC), or combination of the recited components, configured to execute computer instructions. In an embodiment, processor 111 includes memory for caching data. Memory device 115 includes volatile and/or non-volatile computer readable memory, such as, for example, random access memory (RAM), flash memory and the like. In an embodiment, processor 111 is configured to execute instructions from one or more programs and services, such as program 123 and aggregation service 124 stored in memory 115, and to manipulate digital data, such as data structures 121 and 119. Program 123 includes one or more computer executable instruction sets, such as device drivers and programs that perform various functions, such as, for example, controlling peripheral devices, providing capabilities to a user, and managing communication with other devices. In another embodiment, program 123 provides aggregation services to combine elements from two or more data structures, such as, for example, data structure 121.

In an embodiment, data structure 121 and dataset 122, collectively known as a "job ticket", includes one or more data structures that describe functions of various devices and services of network 100. In another embodiment, data structure 121 and dataset 122 describe functions of various services of client device 110, such as, for example, program 123. In yet another embodiment, data structure 119 and dataset 120 describe a combination (e.g., aggregation) of functions and data from a plurality of data structures 121. In one embodiment, data structure 121 is a page of an extensible markup language (XML) or a corresponding extensible style sheet language (XSL), and dataset 122 is a collection of nodes of the page. Generally, a "node" is a unit of reference in a data structure, such as, for example dataset 122 of data structure 121. In one embodiment, data structure 121 is received from a device or service of network 100. In another embodiment, data structure 121 is requested by client device 110 from another device or service of network 100.

User interface 112 is any arrangement of data-entry and display devices configured to display information to a user and to receive user input to client device 110. In an embodiment, user interface 112 includes components such as, for example, a keyboard, a pointing device, and/or a display device suitable for displaying images to a user.

Input/output interface 113 includes one or more communication interfaces configured to provide signal and data input and output to client device 110. In an embodiment, input/output interface 113 includes interfaces such as, for example, a telephone modem, a wireless access point adhering to one or more protocols, such as IEEE 802.11 and the so-called "Bluetooth" protocols, a network interface card, a direct cable interface such as PCI or EIO, a Universal Serial Bus card (USB), an optical port operating in the ultra-violet or infrared range, and the like. In another embodiment, input/output interface 113 is a gateway for a local area network (LAN) or a wide area network (WAN) that couples many devices within a geographic zone, such as for example, a distributed enterprise computer network operating within one or more buildings. A communication-enabled device is a device that incorporates a communication gateway, such as input/output interface 113, having one or more communication interfaces, as described above.

Server 130 is shown further including a processor 131, an input/output interface 133, and a memory device 135. The memory device 135 is shown including an intermediate service 134, a data structure 138 having a dataset 139, a combined capabilities data structure 136 having a dataset 137, and aggregation service 124. Processor 131 is further shown enabled for bidirectional communication with input/output interface 133, and memory device 135. In FIG. 1, server computer 130 is shown enabled for bidirectional communication with various devices of network 100 though a communication interface, such as input/output interface 133. Intermediate service 134 is any service that provides a function to network 100. In one embodiment, intermediate service 134 is a driver for a device connected to network 100 that provides additional functionality for the connected device.

In one embodiment, aggregation service 132 provides data aggregation services to combine elements from two or more data structures, such as, for example, data structure 138. In another embodiment, data structure 138 includes one or more data structures (e.g., features, options, attributes, constraints, macros) that describe functions of various devices and services of network 100. In this embodiment, each data structure 138 defines the capabilities that a service or device is capable of performing. In yet another embodiment, the combined capabilities data structure 136 and dataset 137 describe a combination (e.g., aggregation) of functions and data from a plurality of data structures 138. In an embodiment, the combined capabilities data structure 136 can define the features each device or service is capable of executing, the options/ranges for each feature the device or service supports, the method(s) for invoking the feature, the data necessary to create a user interface (UI) allowing configuration of a job associated with the instantiation, constraints defining feature/option combinations that are not allowed (e.g. stapled transparences), and macros allowing selection of a particular feature/option that triggers the state of features and options. In still another embodiment, data structure 138 is received from a device or service of network 100. In one embodiment, data structure 136 is requested by server 130 from another device or service of network 100. In another embodiment (not shown), additional programs and services are stored in memory device 135. The skilled practitioner will recognize that, in some implementations, server computer 130 includes other components not relevant to the present discussion that will therefore not be discussed.

Database 140 is any communication-enabled mass storage device containing a database. In an embodiment, database 140 is a relational database having entries that correspond to specific addressable accounts, such as for example, email addresses and the like. In another embodiment, database 140 includes data structures describing various functionalities of one or more network-connected devices. In yet another embodiment, database 140 is enabled to generate and provide a data structure describing specific features and functions that database 140 is capable of providing.

Facsimile machine 150 is any communication-enabled facsimile (fax) machine. In an embodiment (not shown), facsimile machine 150 includes a mechanism for digitally scanning documents, a processor, a communication port and one or more memory components. In another embodiment, facsimile machine 150 is enabled to operate as a document copying device. In another embodiment, facsimile machine 150 is enabled to generate and provide a data structure describing specific features and functions that facsimile machine 150 is capable of providing. The configuration and operation of facsimile machines is well known to those skilled in the art, and therefore will not be further discussed.

Printer 160 is any communication-enabled printing device configured for rendering images and documents data files onto tangible media, such as, for example, paper sheet stock. In an embodiment, printer 160 is a multi-function, printer-scanner device enabled to operate as a document copying and sending device. In one embodiment (not shown), printer 160 includes a processor and memory components. In another embodiment, printer 160 is enabled to generate and provide a data structure describing specific features and functions that printer 160 is capable of providing. The configuration and operation of printing devices will be known to the skilled practitioner, and therefore will not be discussed in further detail.

Scanner 170 is any communication-enabled scanning device configured to generate image files. In an embodiment, scanner 170 includes digital, analog or both scanning hardware that is configured to create image data files of media that are located proximate to the scanning hardware. In an embodiment (not shown), scanner 170 includes a processor and memory components. In another embodiment, scanner 170 incorporates an alphanumeric keypad and an alphanumeric display. In yet another embodiment, scanner 170 is enabled to generate and provide a data structure describing specific features and functions that scanner 170 is capable of providing. The configuration and operation of scanning devices will be known to the skilled practitioner, and therefore will not be discussed in further detail.

In another embodiment (not shown), two or more of the above described communication-enabled devices (150, 160, 170) are combined or configured to operate as a single unit, such as, for example, a multi-function peripheral device, and a communication-enabled printing and scanning device.

Figure 2:
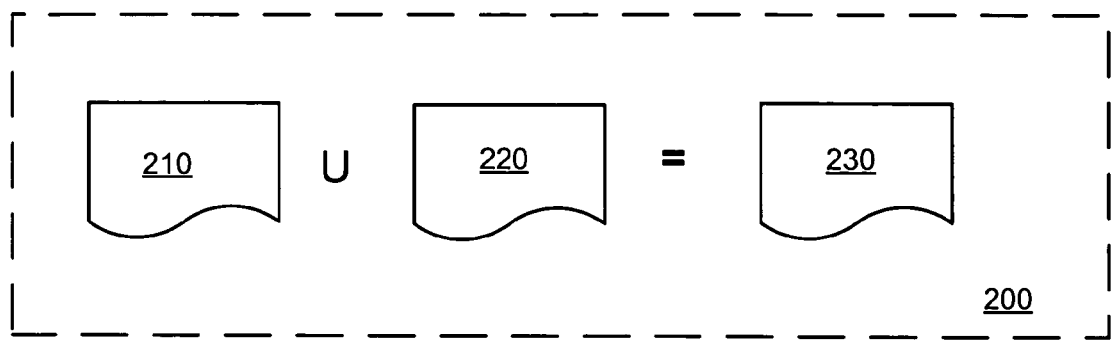
FIG. 2 illustrates a union of a set of data structures, in accordance with an embodiment of the present invention.

FIG. 2 illustrates a union of a set of data structures, in accordance with an embodiment of the present invention. According to an embodiment, a data structure having a dataset is referred to as a "job ticket", which has different classes such as, for example, a "capabilities job ticket", or a "result job ticket", depending on the dataset of the data structure. A dataset of a job ticket describes various elements such as features, options, constraints, macros, attributes and the like. Each element of a dataset (node) has a hierarchical tree structure with a parent-child relationship.

In one embodiment, aggregation is the process of generically merging two or more job-tickets into a resulting aggregated ticket. In another embodiment, an aggregator (aggregating service) is a service that is invoking the aggregation and providing a ticket to aggregate. In yet another embodiment, an aggregate is a service that provides the ticket that is being augmented by aggregation with the aggregator's ticket. In still another embodiment, a capabilities ticket is a job ticket that declares the specific range of operation of that service instantiation.

In one embodiment, aggregation is a real-time merging of the datasets of two or more data structures (job tickets). In an embodiment, the aggregation process is implemented to be data agnostic, yet aware of structural aspects of the job-tickets that are pertinent to aggregation. In another embodiment, aggregation merges the "aggregatable" (e.g., capable of being aggregated) nodes of one data structure (job ticket) with the "aggregatable" nodes of another data structure, without duplication of data within the resulting "merged" data structure. In still another embodiment, the combined capabilities data structure (result job ticket) contains the "aggregated-in" data of a second data structure interleaved seamlessly with all preexisting data of a first data structure producing an augmented job ticket. In another embodiment, the aggregation algorithm is data agnostic because it uses the structure of the ticket, rather then the data payload itself, to accomplish the merge, helping to enable loose coupling of components in the distributed workflow environment.

In one embodiment, aggregation logically merges XML capabilities from disparate services during a sequential processing of a complex task. In another embodiment, the aggregation algorithm is instantiated by job ticketing and workflow technology, in order to provide a way to dynamically retrieve data from services that are available in a distributed environment, such as, for example network 100 of FIG. 1. In one embodiment, the aggregation algorithm takes as input one or more capabilities tickets (data structures) from downstream services and a "local" capabilities ticket that describes the capabilities of a local service. In yet another embodiment, the aggregation algorithm then merges the XML data contained in the capabilities tickets such as features, options, attributes, constraints, macros and the like. In still another embodiment, the aggregation algorithm produces a unified dataset, in the form of a combined capabilities data structure (result job ticket), to be used in a user interface or for consumption by other software. In this manner, the most accurate unified set of data from all sources end is provided to an end-user, for services and devices that are local or not local. In operation, when the user invokes a job based on combined capabilities data structures (result job tickets), a local service then "de-aggregates" the job, resolving any locally-defined features at each service or device, and then passing the remaining features to downstream services. The foregoing process helps enable standardization of end-user experience, streamlined deployment of services, simple software updates, and powerful configuration options.

The key operation in aggregation is the identifying of equivalent nodes in two different capabilities job tickets. In one embodiment, the focus of the algorithm is on resolving the fundamental structures in capabilities job tickets, especially, feature nodes. For example, two job-tickets can have some different and some identical nodes. In one embodiment, job ticket node equivalence is determined based primarily on the defined hierarchical structure. However, in other embodiments, key content and attribute values that identify the node are equated. In an embodiment, nodes that are not aggregatable are either merged, copied, or overwritten. In yet another embodiment, nodes that are identified as not pertinent to aggregation are simply copied from one ticket or the other. In the instant embodiment, the tickets are neither merged nor compared for equivalence. In another embodiment, if the nodes exist in both tickets, they are copied from the ticket that will contain the most current or accurate values for each node tree.

In an embodiment, the basis of aggregation relies on finding equivalence between the aggregatable nodes. In one example, nodes are equated based on their attributes or content. In another example, nodes are equated hierarchically based on parent-child node relationships.

Generally, an identifier for each feature and option in a job ticket is only guaranteed unique within a single node. Therefore, when job tickets are combined, it is possible that identifiers will be duplicated. In one embodiment, all identifier values for unique nodes will be changed to sufficiently guarantee uniqueness during an aggregation process. In an example, the identifier change is accomplished with a combination of heuristics and parser tools.

In one example, an identifier is used to reference a node elsewhere in the same job ticket. In one example, an identifier is used by a "Feature" node to reference a "Constraint" node, or vice versa in a capabilities ticket.

In one embodiment, an aggregating service has the ability to add in entirely new <Group> nodes into a capabilities ticket. In another embodiment, an aggregating service has the ability to restrict the <Feature> nodes available in common <Group> nodes. In yet another embodiment, an aggregating service has the ability to add in entirely new <Feature> nodes into a cap ticket. In still another embodiment, an aggregating service has the ability to merge additional <Option> nodes into to common <Feature> nodes. In yet another embodiment, an aggregating service has the ability to restrict the <Option> nodes available in common <Feature> nodes. In yet another embodiment, an aggregating service has the ability to override <Range> node values in common <Feature> nodes. In still another embodiment, an aggregating service has the ability to merge together certain crucial attributes, such as those which reference other parts of the ticket. In another embodiment, an aggregating service has the ability to add new expressions (constraints and macros) to nodes in a result job ticket.

In one embodiment, a first data structure and a second data structure are combined according to a logical union of identified nodes within each data structure. First and second capabilities data structures can both be authored as valid capabilities tickets. Common nodes are merged without duplication. For example, in a logical union based aggregation, if a first ticket is aggregated with itself, the result will be the first ticket. In other embodiments, different types of aggregation use-cases can be employed. Use-cases can be created that produce the superset (union) of the two tickets nodes, or alternatively aggregation can enforce some limitation on what nodes are produced in the result.

Figure 3:
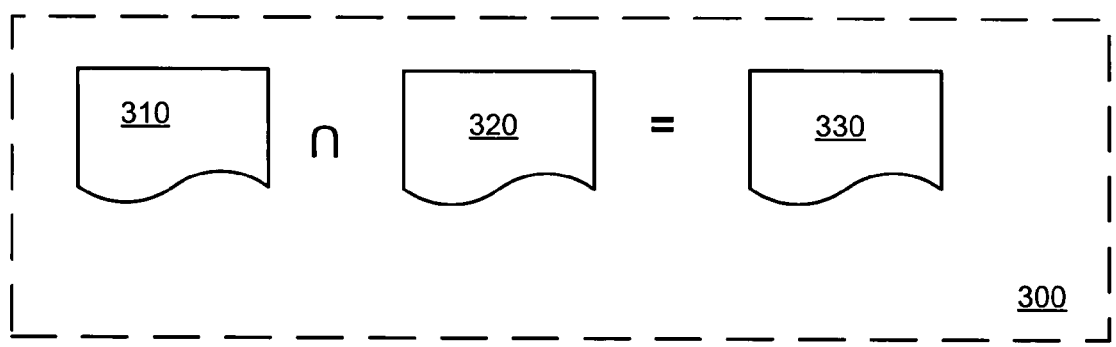
FIG. 3 illustrates an intersection of another set of data structures, in accordance with another embodiment of the present invention.
Figure 4:
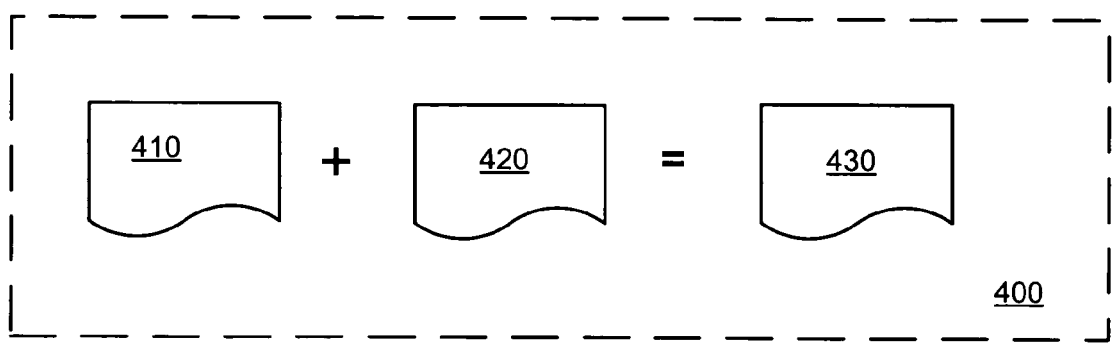
FIG. 4 illustrates a specialized aggregation of yet another set of data structures, in accordance with yet another embodiment of the present invention.

Referring again to FIG. 2, a logical union 200 of a first data structure 210 and a second data structure 220 into a resulting combined capabilities data structure 230 is illustrated. In an example, a pseudo-capabilities ticket format is presented below to illustrate a logical union aggregation process. It will be appreciated by the skilled practitioner that the following examples are illustrative in nature, and that data structures implementing various embodiments of the invention include any data format that provides a functional platform for the combination of capabilities and intent data structures whether via XML/XSL or any other data structure form. The following examples, in reference to FIGS. 2-4, illustrate an attribute at the Feature/Option level. In the following examples, the features of each pseudo-capabilities ticket are the same feature with different options. In the following examples, the key attribute that controls aggregation is "extensionAllowed." If the extensionAllowed attribute is set to 'false' on a node, no aggregator can add (merge in) children to that node. In another embodiment, if extension allowed is 'true', it allows for the merging of new child nodes into the aggregation result ticket.

In an illustrative example of a logical union of job tickets 200 according to FIG. 2, a first job ticket 210 comprises the following dataset:

```
<feature extensionAllowed='true'>
    <option>A</option>
    <option>B</option>
    <option>C</option>
<feature>
```

A second job ticket 220 comprises the following dataset:

```
<feature extensionAllowed='true'>
    <option>C</option>
    <option>D</option>
<feature>
```

An aggregation process that provides a logical union of the first and second dataset produces the following result ticket 230.

```
<feature extensionAllowed='true'>
    <option>A</option>
    <option>B</option>
    <option>C</option>
    <option>D</option>
<feature>
```

The result ticket 230 includes <options>A, B and C of the first ticket 210 and <option>D of the second ticket 220.

FIG. 3 illustrates an intersection of another set of data structures, in accordance with another embodiment of the present invention. In an example, a pseudo-capabilities ticket format is presented below to illustrate a logical intersection aggregation process.

In an illustrative example of a logical intersection of job tickets 300 according to FIG. 3, a first job ticket 310 comprises the following dataset:

```
<feature extensionAllowed='false' >
    <option>A</option>
    <option>B</option>
    <option>C</option>
<feature>
```

A second job ticket 320 comprises the following dataset:

```
<feature extensionAllowed=false>
    <option>C</option>
    <option>D</option>
<feature>
```

An aggregation process that provides a logical intersection of the first and second dataset produces the following result ticket 330.

```
<feature extensionAllowed='false'>
    <option>C</option>
<feature>
```

The result ticket 330 includes <option>C, which is common to both the first and second datasets, while <options>B of the first ticket 310 and <option>D of the second ticket 320 are excluded from the result ticket 330.

FIG. 4 illustrates a specialized aggregation of yet another set of data structures, in accordance with yet another embodiment of the present invention. A specialized aggregation allows selected exclusions of features and options, based on a predetermined rule set. The rule set is defined, for example, by a detected device capability, or an administrator. If the "extensionAllowed" attribute is set to 'false' on a node, no aggregator can add children to that node. In another embodiment, if the "extensionAllowed" attribute is 'true,' it allows for the merging of new child nodes into the aggregation result ticket.

In a first illustrative example of a specialized aggregation of job tickets 400 according to FIG. 4, a first job ticket 410 comprises the following dataset:

```
<feature extensionAllowed='false'>
    <option>A</option>
    <option>B</option>
    <option>C</option>
<feature>
```

A second job ticket 420 comprises the following dataset:

```
<feature extensionAllowed='true'>
    <option>C</option>
    <option>D</option>
<feature>
```

An aggregation process that provides a specialized aggregation of the first and second dataset produces the following result ticket 430.

```
<feature extensionAllowed='false'>
    <option>A</option>
    <option>B</option>
    <option>C</option>
<feature>
```

The result ticket 430 includes only <option>A, B and C based on the restriction of the extensionAllowed='false' attribute of the first ticket 410, while <options>D of the second ticket 420 is excluded from the result ticket 430.

In a second illustrative example of a specialized aggregation of job tickets 400 according to FIG. 4, a first job ticket 410 comprises the following dataset:

```
<feature extensionAllowed='true'>
    <option>A</option>
    <option>B</option>
    <option>C</option>
<feature>
```

A second job ticket 420 comprises the following dataset:

```
<feature extensionAllowed='false'>
    <option>C</option>
    <option>D</option>
<feature>
```

An aggregation process that provides a specialized aggregation of the first and second dataset produces the following result ticket 430.

```
<feature extensionAllowed='false'>
    <option>C</option>
    <option>D</option>
<feature>
```

In contrast to the above first example, the result ticket 430 now includes only <option>C and D based on the restriction of the extensionAllowed='false' attribute of the second ticket 420, while <options>A and B of the first ticket 410 are now excluded from the result ticket 430.

Figure 5:
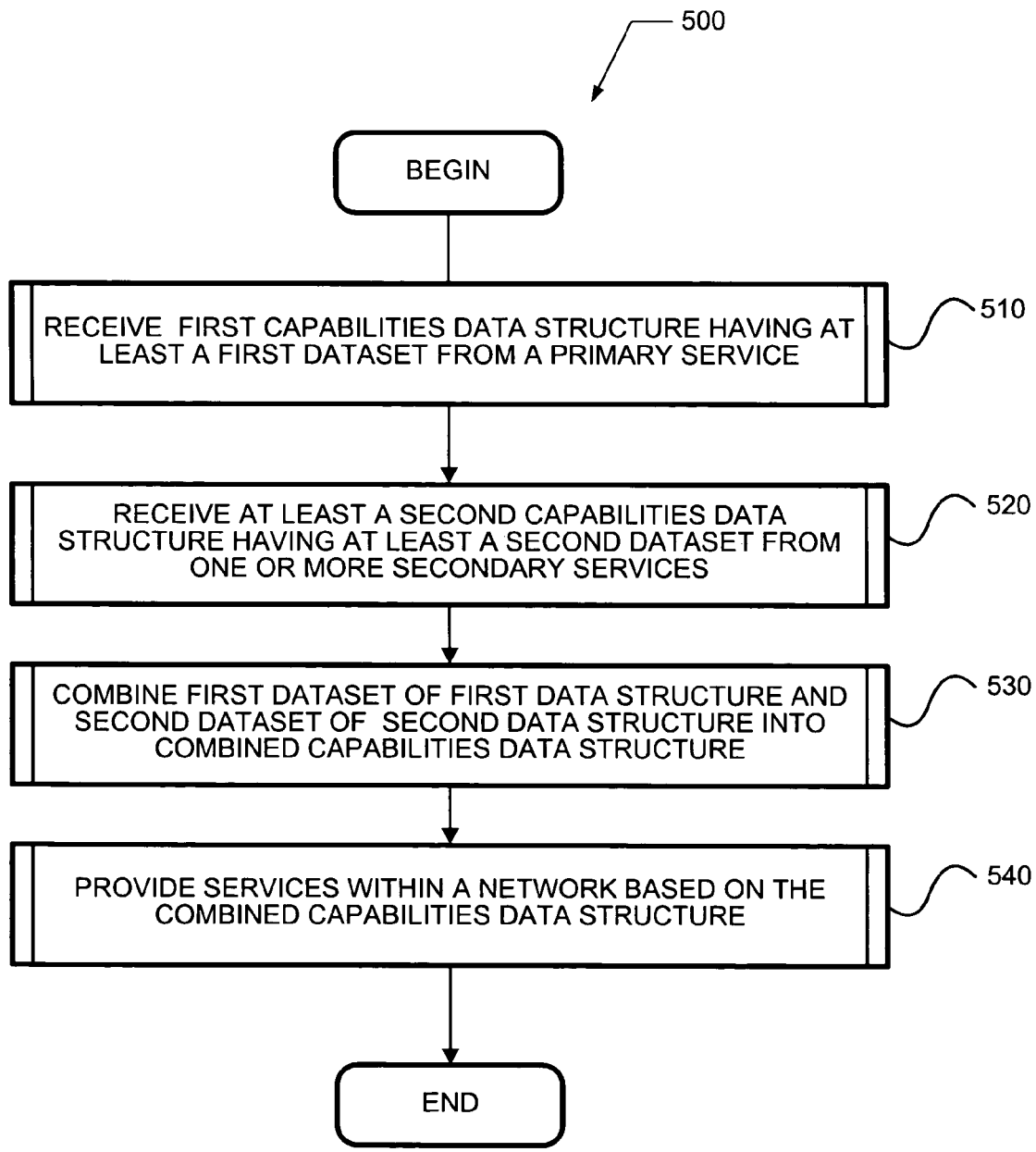
FIG. 5 is a flow diagram depicting a method, in accordance with an embodiment of the present invention.

FIG. 5 is a flow diagram depicting a method, in accordance with an embodiment of the present invention. FIG. 5 illustrates a method 500 of capabilities management in a processor-controlled network. In one embodiment, method 500 is implemented with components of the exemplary network 100 of FIG. 1 and with reference to the graphical representations described in FIGS. 2-4. In another embodiment, one or more steps of method 500 are embodied in a computer readable medium containing computer readable code, such that a series of steps are implemented when the computer readable code is executed on a computing device. Various steps of the method 500 are described with respect to a client device performing the method. In some implementations, certain steps of method 500 are combined, performed simultaneously or in a different order, without deviating from the objective of method 500 or producing different results. Method 500 begins in step 510.

In step 510, a first capabilities data structure having at least a first dataset is received from a primary service. In an embodiment, the first capabilities data structure is received at any time that network 100 is operational. In one embodiment, the first data structure dataset comprises one or more nodes arranged in a parent-child hierarchy. In another embodiment, the first data structure describes functional capabilities of a service or device of network 100.

In step 520, a second capabilities data structure having at least a second dataset is received from one or more secondary services. In an embodiment, the second capabilities data structure is received at any time that network 100 is operational. In one embodiment, the dataset of the second data structure comprises one or more nodes arranged in a parent-child hierarchy. In another embodiment, the second data structure describes functional capabilities of a service or device of network 100.

In step 530, the first dataset of the first data structure and the second dataset of the second data structure are combined into a combined capabilities data structure. In one embodiment, the first dataset of the first data structure and the second dataset of the second data structure are combined at any time after the first data structure and the second data structure are received. In another embodiment, combining the first and the second capabilities data structures includes identifying the first dataset and the second datasets in the first and second capabilities data structures. The embodiment also includes determining the combinability of the at least first and at least second datasets and generating the combined capabilities data structure, where the combined capabilities data structure has a third dataset based on the first and second datasets. The embodiment further includes copying the first and second datasets into the combined capabilities data structure when the identified first and second datasets are determined not to be combinable, and merging the first and second datasets into the combined capabilities data structure when the datasets are determined to be combinable.

In another embodiment, the datasets include data selected from the group consisting of attributes, content and hierarchies. In still another embodiment, the step of determining the combinability of the first and at least second datasets includes identifying selected attributes, content and hierarchies of the first and at least second datasets, and then determining whether any of the selected attributes, content and hierarchies between the first and at least second datasets are equivalent.

Another embodiment further includes flagging the first and second datasets as not combinable when selected attributes, content and hierarchies between the first and at least second datasets are determined not to be equivalent.

In yet another embodiment, merging the first and second datasets into the combined capabilities data structure when the datasets are combinable includes the steps of comparing the identified first dataset to the at least second dataset, and then integrating selected equivalent content and attributes of the first and second datasets based on the identified equivalent hierarchies of the first and second datasets.

In one embodiment, the step of merging the first and second datasets into the combined capabilities data structure when the datasets are combinable includes forming a logical union of the first and second datasets.

In another embodiment, the step of merging the first and second datasets into the combined capabilities data structure when the datasets are combinable comprises forming a logical intersection of the first and second datasets.

In yet another embodiment, the step of merging the first and second datasets into the combined capabilities data structure when the datasets are combinable comprises forming a specialized capabilities dataset based on the first and second datasets.

In step 540, services are provided within the network based on the combined capabilities data structure. In one embodiment, the services are provided though an intent ticket comprising a combined capabilities data structure coupled with a job invocation. In another embodiment, the step of providing services within the network based on the combined capabilities data structure includes the steps of receiving a service invocation, decoupling selected capabilities for the primary service from the combined capabilities data structure as the capabilities are consumed, and then passing the remaining capabilities within the combined capabilities data structure to the one or more secondary services.

Figure 6:
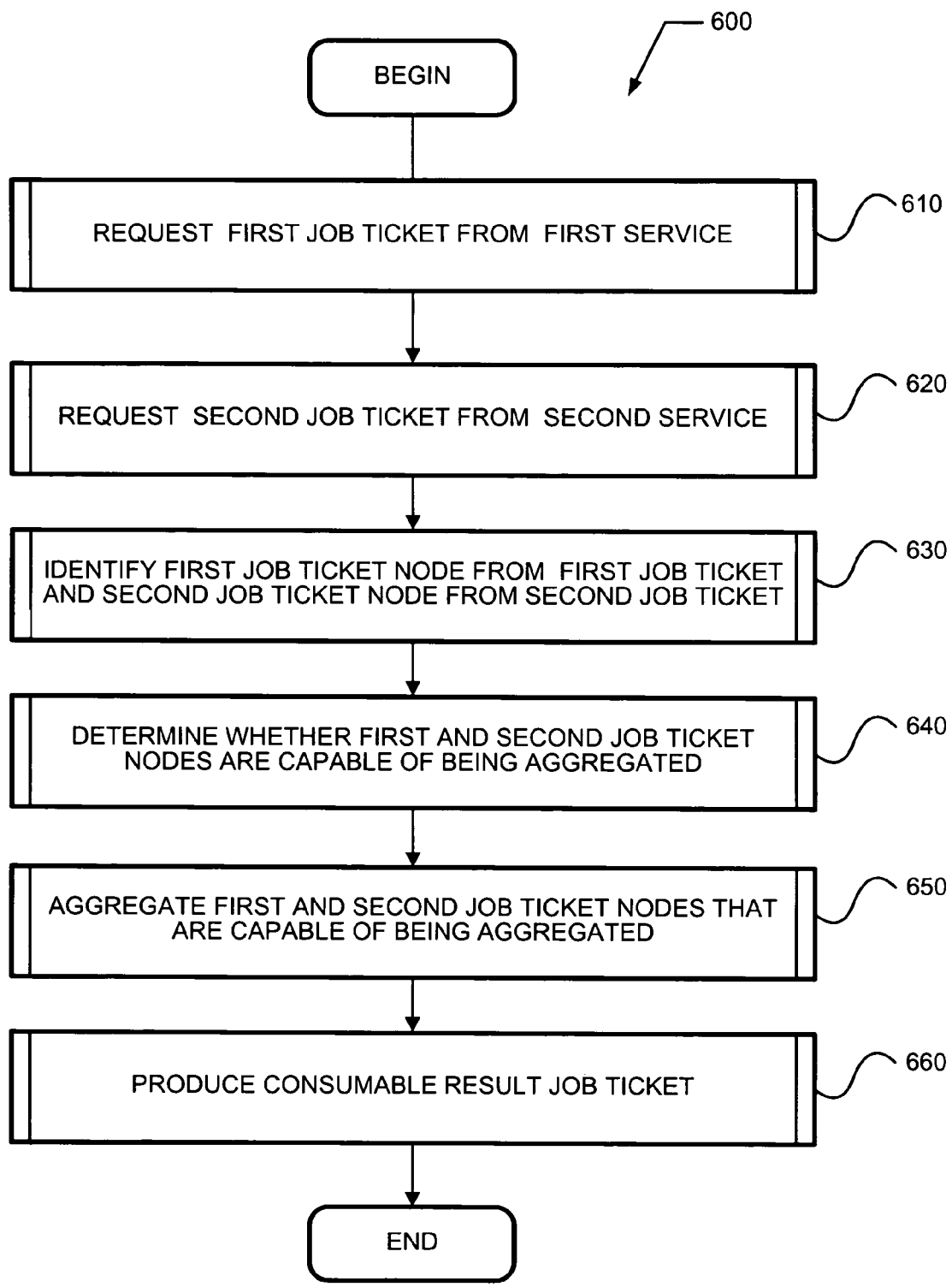
FIG. 6 is a flow diagram depicting a method, in accordance with yet another embodiment of the present invention.

FIG. 6 is a flow diagram depicting a method, in accordance with yet another embodiment of the present invention. FIG. 6 illustrates a method 600 of managing capabilities distributed in a network. In one embodiment, method 600 is implemented with components of the exemplary network of FIG. 1 and the graphical representations described with reference to FIGS. 2-4. In another embodiment, one or more steps of method 600 are embodied in a computer readable medium containing computer readable code such that a series of steps are implemented when the computer readable code is executed on a computing device. Various steps of the method 600 are described with respect to a client device performing the method. In some implementations, certain steps of method 600 are combined, performed simultaneously or in a different order, without deviating from the objective of method 600 or producing different results. Method 600 begins in step 610.

In step 610, a first job ticket is requested from a first service. In an embodiment, the first job ticket is requested when a service is invoked. In another embodiment, the first job ticket is requested at any time that network 100 is operational. In one embodiment, the first job ticket comprises a capabilities job ticket having one or more nodes arranged in a parent-child hierarchy. In another embodiment, the first job ticket describes functional capabilities of a service or device of network 100. In yet another embodiment, the first job ticket includes a service invocation for a capabilities aggregation.

In step 620, a second job ticket is requested from at least a second service. In an embodiment, the second job ticket is requested when a service is invoked. In another embodiment, the second job ticket is requested at any time that network 100 is operational. In one embodiment, the second job ticket comprises a capabilities job ticket having one or more nodes arranged in a parent-child hierarchy. In another embodiment, the first job ticket describes functional capabilities of a service or device of network 100.

In step 630, a first job ticket node is identified from the requested first job ticket, and a second job ticket node is identified from the second job ticket. In one embodiment, the first and second job ticket nodes are identified at any time after the tickets are requested. In another embodiment, the first and second job ticket nodes are defined by first and second job ticket node hierarchies. The instant embodiment further includes the steps of identifying at least a first job ticket node from the requested first job ticket, and at least a second job ticket node from the second job ticket, comprises determining the first and second job ticket node hierarchies of the first and second job tickets. In yet another embodiment, wherein the first and second job ticket node hierarchies are defined by a node type, the node type is selected from the group consisting of option nodes, attribute nodes, constraint nodes, and macro nodes.

In step 640, a determination is made whether the identified first and second job ticket nodes are capable of being aggregated. In one embodiment, the determination is made at any time after the respective nodes are identified. In another embodiment, the step of determining whether the identified first and second job ticket nodes are capable of being aggregated includes comparing the identified first and second job ticket node hierarchies, and then flagging one or more equivalent node hierarchies between the first and second job tickets. In one embodiment, the nodes are flagged by an aggregation algorithm, such as aggregation services 124 and 132 of network 100.

In step 650, the first and second job ticket nodes that are capable of being aggregated are then aggregated. In an embodiment, the aggregation occurs at any time after the determination that the nodes are capable of being aggregated. In another embodiment, the step of aggregating the identified first and second job ticket nodes that are capable of being aggregated includes the steps of determining selected first and second job ticket nodes having hierarchies flagged as equivalent, and then determining a most current node of the first and second nodes flagged as equivalent.

In step 650, a consumable result job ticket is produced that includes the aggregated first and second job ticket nodes. In one embodiment, the consumable result ticket is a data structure that includes service descriptions that are uncoupled from the data structure as the service described by the data structure is executed. In another embodiment, a consumable job ticket including a service invocation from a user (intent ticket) is produced by receiving a user input. In yet another embodiment, the step of producing a consumable result job ticket that includes the aggregated first and second job ticket nodes includes the step of copying selected first and second nodes of the first and second job tickets into the consumable result job ticket when the nodes are not capable of being aggregated. The instant embodiment also includes the step of merging selected first and second nodes of the first and second job tickets into the hierarchy of the consumable result capabilities ticket when the nodes are capable of being aggregated.

Another embodiment further includes the step of changing an identification tag of a node undergoing an aggregation to guarantee that a unique node identifier is retained after a merge. In another embodiment, the step of producing a consumable result job ticket that includes the aggregated first and second job ticket nodes includes the step of forming a logical union of the first and second nodes of the first and second job tickets that are capable of being aggregated. In still another embodiment, the step of producing a consumable result job ticket that includes the aggregated first and second job ticket nodes includes the step of forming a logical intersection of the first and second nodes of the first and second job tickets that are capable of being aggregated. In still another embodiment, the step of producing a consumable result job ticket that includes the aggregated first and second job ticket nodes includes the step of forming a specialized result job ticket dataset based on the first and second nodes of the first and second job tickets that are capable of being aggregated.

Another embodiment further includes the step of providing services within the network based on the consumable result job ticket, wherein selected functions of the job ticket are decoupled from the consumable result job ticket as the selected functions of the job ticket are executed by a primary service, and further wherein the remaining functions within the consumable result job ticket are subsequently passed to at least one secondary service.

The following scenario provides an example of capabilities management in a processor-controlled network. In an exemplary operating environment, a printer 160 is deployed in an enterprise network 100 (FIG. 1). Services are installed between the end-user (e.g., client device 110) and the printer 160 to manage destination of jobs and to enable additional functions. A printer driver is deployed on the client device 160 (e.g., program 123), and client side applications are deployed on the client device 160 (e.g., a different program 123). A client side application, such as a word processor, is deployed on client device 160 (e.g., yet another program 123). A user invokes a job through a client application, such as a word processor, and wishes to set the value of the pages-per-sheet feature to 4 and print in color. Information is retrieved from all available services in the network 100. The invoked printer 160 supports color printing, but only supports 1-2 pages-per-sheet. The printer driver at the client device 110 supports 1, 2, 3, 4, 5, 6, or 7 pages per sheet. The printer driver at the client device 110 has no information on what the printer 160 supports, and vice versa. The printer driver produces a ticket describing its own services, and other services produce additional tickets describing the services that each provides. The client receives a capabilities ticket from the network specifying the capabilities available from service. An aggregation algorithm takes the ticket from the services and aggregates it with the ticket from the printer driver. Both tickets include the pages-per-sheet feature, but only one includes the print-in-color feature. The aggregation algorithm produces the superset (union) of features provided by all tickets. Therefore, the print-in-color feature will be included in the result. For features that are common to more then one ticket, the aggregation algorithm determines how the options within each feature differ and produces a superset of the options in both tickets. The additional options for the pages per sheet feature are merged into the pages-per-sheet feature in the printer ticket, thereby producing a unified pages-per-sheet feature in the final aggregated result ticket. Next, the user is presented with the aggregated feature set. The user selects color printing, 4 pages per sheet. An intent ticket is produced based on received user selections. The job is then sent to downstream services where it is de-aggregated. The driver executes the pages-per-sheet feature. The printer receives the valid intent ticket and prints the job in color.

In a second example, having the same network configuration as the above example, a new driver is deployed to provide only one page-per-sheet. The constraint feature overrides the capabilities provided by the printer 160 and any interceding drivers, without further manipulation or time required by a network administrator.

In yet another example, again having the same network configuration as the above example, a new facsimile service comes online in the network. The aggregation service recognizes the new fax service features and aggregates them into a result ticket that provides the aggregated information to a user though a user interface (e.g., 112). The features of the new fax service can then be de-aggregated in downstream workflow and the job can be dispatched to the fax service and the printer 160.

It is anticipated that the invention will be embodied in other specific forms not described that do not depart from its spirit or essential characteristics. The described embodiments are to be considered in all respects only as illustrative and not restrictive, the scope of the invention being defined by the appended claims and equivalents thereof.

We claim:

1. A computer-implemented method of capabilities management in a processor-controlled network, comprising:

receiving a first capabilities data structure in a computer distributed work environment having at least a first dataset from a primary service;

receiving at least a second capabilities data structure having at least a second dataset from one or more secondary services;

dynamically retrieving data from services that are available in the computer distributed work environment;

combining in real-time at least the first dataset of the first data structure and at least the second dataset of the at least second data structure into a seamlessly interleaved combined capabilities data structure with all preexisting data of the first data structure;

implementing, when combining, a data agnostic process that uses the first structure rather than a data payload itself to enable loose coupling of components in the computer distributed workflow environment;

providing services within the network based on the combined capabilities data structure; and using a local service to decouple the combined capabilities data structure for resolving any locally-defined features at each service.

2. The method of claim 1, and wherein combining the first capabilities data structure and the at least second capabilities data structure comprises:

identifying at least the first dataset in the first capabilities data structure and at least the second dataset in the second capabilities data structure;

determining the combinability of the at least first and at least second datasets;

generating the combined capabilities data structure, the combined capabilities data structure having at least a third dataset based on the first and second datasets; and merging the first and second datasets into the combined capabilities data structure when the datasets are determined to be combinable.

3. The method of claim 2, and wherein the datasets include data selected from the group consisting of attributes, content and hierarchies.

4. The method of claim 3, and wherein determining the combinability of the first and at least second datasets comprises:
identifying selected attributes of the first and at least second datasets;
identifying selected content of the first and at least second datasets;
identifying selected hierarchies of the first and at least second datasets; and
determining whether the selected attributes, content and hierarchies between the first and at least second datasets are equivalent.

5. The method of claim 4, and further comprising flagging the first and second datasets as not combinable when selected attributes, content and hierarchies between the first and at least second datasets are determined not to be equivalent.

6. The method of claim 4, and wherein merging the first and second datasets into the combined capabilities data structure when the datasets are combinable comprises:
comparing the identified first dataset to the at least second dataset; and
integrating selected equivalent content and attributes of the first and second datasets based on the identified equivalent hierarchies of the first and second datasets.

7. The method of claim 2, and wherein merging the first and second datasets into the combined capabilities data structure when the datasets are combinable comprises forming a logical union of the first and second datasets.

8. The method of claim 2, and wherein merging the first and second datasets into the combined capabilities data structure when the datasets are combinable comprises forming a logical intersection of the first and second datasets.

9. The method of claim 2, and wherein merging the first and second datasets into the combined capabilities data structure when the datasets are combinable comprises forming a specialized capabilities dataset based on the first and second datasets.

10. The method of claim 1, and wherein providing services within the network based on the combined capabilities data structure comprises:
receiving a service invocation;
decoupling selected capabilities for the primary service from the combined capabilities data structure as the capabilities are consumed; and
passing the remaining capabilities within the combined capabilities data structure to the one or more secondary services.

11. A computer readable medium storing a computer program to provide capabilities management in a processor-controlled network, the program comprising:
computer readable code to receive a first capabilities data structure having at least a first dataset from a primary service;
computer readable code to receive at least a second capabilities data structure having at least a second dataset from one or more secondary services;
computer readable code to dynamically retrieve data from services that are available in the computer distributed work environment;
computer readable code to combine in real-time a first dataset of the first data structure and a second dataset of the second data structure into a seamlessly interleaved combined capabilities data structure with all preexisting data of the first data structure;
computer readable code to implement, when combining, a data agnostic process that uses the first structure rather than a data payload itself to enable loose coupling of components in the computer distributed workflow environment;
computer readable code to provide services within the network based on the combined capabilities data structure;
computer readable code to provide awareness of structural aspects of the first and second datasets that are pertinent to aggregation without duplication of data within the combined capabilities data structure; and
computer readable code to use a local service to decouple the combined capabilities data structure for resolving any locally-defined features at each service.

12. The computer readable medium of claim 11, and wherein the computer readable code to combine the first capabilities data structure and the second capabilities data structure comprises:
computer readable code to identify the first dataset in the first capabilities data structure and the second dataset in the second capabilities data structure;
computer readable code to determine the combinability of the at least first and at least second datasets computer readable code to generate the combined capabilities data structure, the combined capabilities data structure having at least a third dataset based on the first and second datasets; and
computer readable code to merge the first and second datasets into the combined capabilities data structure when the datasets are determined to be combinable.

13. The computer readable medium of claim 12, and wherein the first and second datasets include data selected from the group consisting of attributes, content and hierarchies.

14. The computer readable medium of claim 13, and wherein computer readable code to determine the combinability of the first and at least second datasets comprises:
computer readable code to identify selected attributes of the first and second datasets;
computer readable code to identify selected content of the first and second datasets;
computer readable code to identify selected hierarchies of the first and second datasets; and
computer readable code to determine whether selected attributes, content and hierarchies between the first and at least second datasets are equivalent.

15. The computer readable medium of claim 14, and further comprising flagging the first and second datasets as not combinable when selected attributes, content and hierarchies between the first and at least second datasets are determined not to be equivalent.

16. The computer readable medium of claim 14, and wherein computer readable code to merge the first and second datasets into the combined capabilities data structure when the datasets are combinable comprises:
computer readable code to compare the identified first data set to the second dataset; and
computer readable code to integrate selected equivalent content and attributes of the first and second datasets based on the identified equivalent hierarchies of the first and second datasets.

17. The computer readable medium of claim 12, and wherein computer readable code to merge the first and second datasets into the combined capabilities data structure when the datasets are combinable comprises computer readable code to form a logical union of the first and second datasets.

18. The computer readable medium of claim 12, and wherein computer readable code to merge the first and second datasets into the combined capabilities data structure when the datasets are combinable comprises computer readable code to form a logical intersection of the first and second datasets.

19. The computer readable medium of claim 12, and wherein computer readable code to merge the first and second datasets into the combined capabilities data structure when the datasets are combinable comprises computer readable code to form a specialized capabilities dataset based on the first and second datasets.

20. The computer readable medium of claim 11, and wherein computer readable code to provide services within the network based on the combined capabilities data structure comprises:
  receiving a service invocation;
  decoupling selected capabilities for the primary service from the combined capabilities data structure as the capabilities are consumed; and
  passing the remaining capabilities within combined capabilities data structure to the one or more secondary services.

* * * * *